United States Patent
Steinsiek et al.

(10) Patent No.: US 7,423,767 B2
(45) Date of Patent: Sep. 9, 2008

(54) METHOD AND APPARATUS FOR TRANSMITTING ENERGY VIA A LASER BEAM

(75) Inventors: Frank Steinsiek, Bremen (DE);
Karl-Heinz Weber, Bremen (DE);
Wolf-Peter Foth, Weyhe (DE);
Hans-Jochen Foth, Kaiserslautern (DE);
Christian Schaefer, Bad Wildungen (DE)

(73) Assignee: EADS Space Transportation GmbH, Bremen (DE)

( * ) Notice: Subject to any disclaimer, the term of this patent is extended or adjusted under 35 U.S.C. 154(b) by 681 days.

(21) Appl. No.: 11/040,827

(22) Filed: Jan. 20, 2005

(65) Prior Publication Data
US 2005/0190427 A1    Sep. 1, 2005

(30) Foreign Application Priority Data
Feb. 21, 2004  (DE) .................... 10 2004 008 681

(51) Int. Cl.
*G01B 11/00*   (2006.01)
*G01C 3/08*    (2006.01)
*G01N 21/86*   (2006.01)

(52) U.S. Cl. ............. 356/614; 356/4.07; 250/559.29; 250/216; 398/129

(58) Field of Classification Search ... 356/141.1–141.5, 356/4.07, 614, 3.06; 250/559, 29, 559.33, 250/206.1, 206.2, 216; 398/129
See application file for complete search history.

(56) References Cited

U.S. PATENT DOCUMENTS

| | | | |
|---|---|---|---|
| 3,723,003 A * | 3/1973 | Vockenhuber et al. ..... 353/3.06 |
| 3,942,894 A | 3/1976 | Maier | |
| 3,946,233 A * | 3/1976 | Erben et al. .................. 250/347 |
| 4,836,672 A * | 6/1989 | Naiman et al. ............. 356/5.06 |
| 4,836,673 A * | 6/1989 | Esquivel H. ................. 356/300 |
| 5,142,400 A * | 8/1992 | Solinsky ...................... 398/129 |
| 5,199,304 A * | 4/1993 | Ferguson ...................... 73/800 |
| 5,200,606 A * | 4/1993 | Krasutsky et al. ........... 250/216 |
| 5,260,639 A | 11/1993 | DeYoung et al. | |
| 5,534,705 A * | 7/1996 | Terawaki et al. ....... 250/559.29 |
| 5,610,750 A * | 3/1997 | Popescu et al. ............. 398/118 |
| 5,627,669 A * | 5/1997 | Orino et al. ................. 398/129 |
| 6,407,535 B1 | 6/2002 | Friedman et al. | |
| 6,534,705 B2 | 3/2003 | Berrios et al. | |

FOREIGN PATENT DOCUMENTS

EP            1 191 715         3/2002

* cited by examiner

*Primary Examiner*—Sang Nguyen
(74) *Attorney, Agent, or Firm*—W. F. Fasse; W. G. Fasse

(57) ABSTRACT

To transmit energy without direct mechanical or electrical contact, a transmitter unit emits a laser beam onto a radiation receiver of a receiver unit including a photovoltaic cell arrangement surrounded by a ring-shaped reflector. A portion of the laser beam is reflected from the reflector back to the transmitter unit, where the received reflected signal is evaluated to determine the position of the laser beam impinging on the radiation receiver. The transmitter unit deflects the laser beam as necessary to impinge directly on the photovoltaic cell arrangement and track any relative motion of the receiver unit. The receiver unit orients the radiation receiver to optimize the energy reception. The position of the laser beam is modulated and the resulting variation of the reflected signal is evaluated to determine therefrom the position of the laser beam on the radiation receiver.

18 Claims, 5 Drawing Sheets

METHOD AND APPARATUS FOR TRANSMITTING ENERGY VIA A LASER BEAM

PRIORITY CLAIM

This application is based on and claims the priority under 35 U.S.C. §119 of German Patent Application 10 2004 008 681.8, filed on Feb. 21, 2004, the entire disclosure of which is incorporated herein by reference.

FIELD OF THE INVENTION

The invention relates to a method and an apparatus for transmitting energy from a transmitter unit to a receiver unit by means of coherent electromagnetic radiation.

BACKGROUND INFORMATION

Methods and apparatuses of the above mentioned general type are conventionally known for transmitting relatively small energy quantities over relatively short distances without a direct mechanical and/or electrical contact between a transmitter unit and a receiver unit. The receiver unit can then make use of the received energy for its own autonomous energy supply needs. As mentioned, the known methods and apparatuses are practically exclusively used for the transmission of energy over short distances and only for small energy quantities, because it has previously not been practically possible to transmit large energy quantities over large distances, due to shortcomings of the known energy transmission methods and apparatuses.

SUMMARY OF THE INVENTION

In view of the above, it is an object of the invention to provide a method of transmitting energy between a transmitter unit and a receiver unit in a wireless manner so as to automatically provide the required energy supply to a far-distant mobile receiver unit over a comparatively large transmission distance. Furthermore, the inventive method shall be simple, reliable, secure, safe, and flexibly applicable. Another object of the invention is to provide a simple apparatus for carrying out such a method. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in a method of transmitting energy by means of coherent electromagnetic radiation between a transmitter unit and a receiver unit, wherein the electromagnetic radiation is particularly a laser beam. The inventive method involves transmitting an oriented or directed and regulated laser beam from the transmitter unit to the receiver unit. A portion of the incident laser beam radiation falling on the receiver unit is reflected back to the transmitter unit, which in turn receives the reflected light signal. The method further involves evaluating the received reflected light signal to derive therefrom informations to be used as a basis for orienting or directing the transmitter unit. These informations are provided to a regulating unit connected to an orienting or directing unit for the transmitter unit. Thus, the regulating unit controls or regulates the orienting unit to direct the transmitter unit in response to and dependent on the informations derived from the received reflected light signal.

The above objects have further been achieved according to the invention in an apparatus adapted to carry out such a method. The apparatus comprises a transmitter unit adapted to generate and emit an orientable or directable laser beam, and a receiver unit that receives the incident radiation of the laser beam. Further according to the invention, the transmitter unit comprises at least one deflector mirror adapted to deflect the laser beam, whereby this at least one deflector mirror is movable by at least one actuator or drive arrangement under the control of a control unit. The receiver unit comprises a radiation receiver arrangement including a retro-reflector arranged in a ring-shape around a photocell, photovoltaic cell, or solar cell arrangement.

In an advantageous further embodiment of the invention, the receiver unit further includes an automatic orienting or directing unit that is adapted to orient or direct the energy reception field optimally to the incident energy beam, i.e. the incident laser beam transmitted by the transmitter unit.

According to another advantageous further embodiment of the invention, the position of the laser beam is modulated, whereby the relative position of the laser beam impinging on the radiation receiver, and therewith also the motion of the receiver unit relative to the transmitter unit, can be analyzed or evaluated on the basis of the modulation information returned in the reflected light. The emitted laser beam is then appropriately moved or directed by the transmitter unit so as to follow or track the receiver unit on the basis of this information. The regulation according to the invention in this manner, which is based on measuring and evaluating or analyzing the intensity of the reflected radiation, thereby makes it possible for the emitted laser beam to follow or track the receiver unit during the movement of the receiver unit both in the horizontal direction as well as the vertical direction.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF PREFERRED EXAMPLE EMBODIMENTS AND OF THE BEST MODE OF THE INVENTION

The inventive apparatus or system for transmitting energy includes a transmitter unit T (see FIGS. 1 and 2) and a receiver unit (R) (see FIGS. 3 to 5), which are arranged remotely and are autonomous from one another, and which have no direct mechanical and/or electrical connection therebetween for transmitting energy therebetween. The transmitter unit T generates and emits a laser beam L that is transmitted over a substantial distance to the receiver unit R, which receives the laser beam L and extracts its required operating energy supply from the laser beam L. For example, the receiver unit R includes a laser beam radiation receiver arrangement incorporating one or more photovoltaic or "solar" cells, which receive the incident laser beam L and convert the received beam energy into electrical energy, which is then used to satisfy at least a portion, or preferably all, of the on-board operating energy requirements of the receiver unit R. The receiver unit R may be embodied to carry out a broad range of essentially any conventionally known energy-consuming functions. The energy received from the laser beam L can be used directly for supplying these energy-consuming functions, and/or may be used to charge a battery or the like, from which electrical energy is then drawn as needed by the energy-consuming functions.

Figure 1:
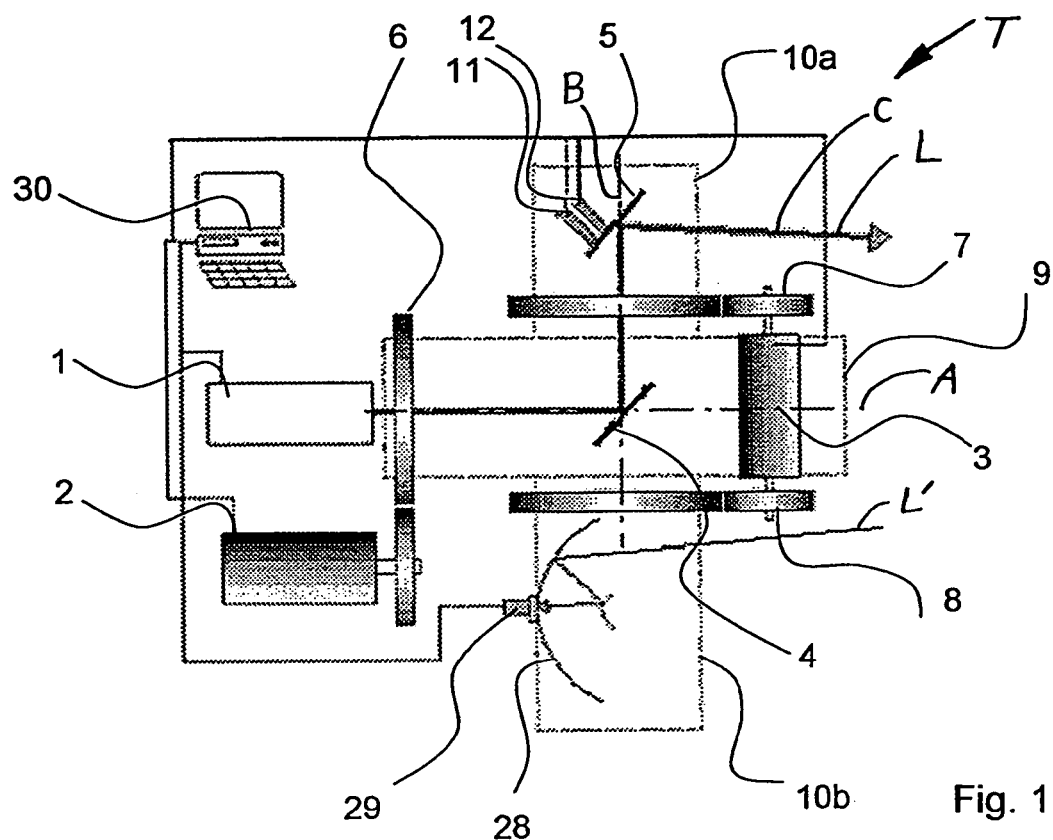
FIG. 1 is a schematic diagram showing the general construction and the basic components of a transmitter unit according to the invention.
Figure 2:
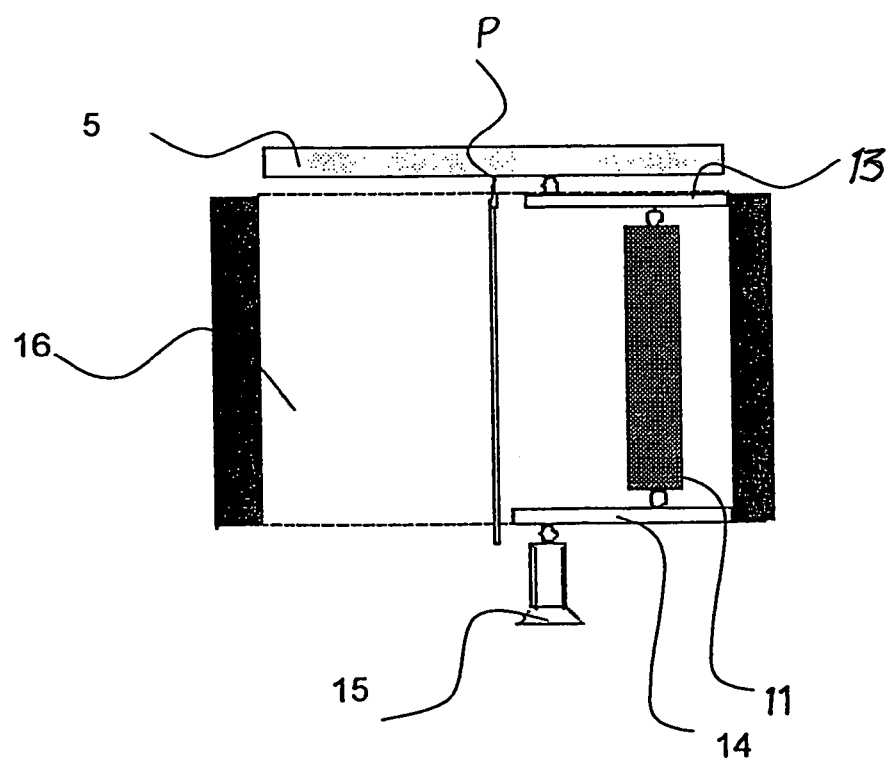
FIG. 2 is a schematic detail view of a portion including a deflector mirror of the transmitter unit according to FIG. 1.

FIGS. 1 and 2 schematically show the transmitter unit T. The transmitter unit T includes a laser unit 1 that serves as an energy source and generates a laser beam L, for example having a wavelength in a range from 200 nm to 10 μm. The laser beam L is then somewhat spread or expanded through an expanding optics integrated into the laser unit 1, before being deflected through a deflector arrangement including three movable, e.g. rotatable, deflector units 9, 10A and 10B.

The rotatable deflector units 10A and 10B as well as a drive unit 3 are securely mounted on the rotatable deflector unit 9, which is driven by a drive unit 2 via a drive ring 6 to rotate about the axis A. Each drive unit 2 and 3 respectively includes a motor and a transmission or gearing. The axis A about which the deflector unit 9 is rotatable coincides with the optical axis of the laser beam L emitted by the laser unit 1. The deflector unit 9 includes a first deflector mirror 4 securely mounted at an angle of 45° relative to the rotation axis A. This first deflector mirror 4 deflects the laser beam L from the direction of the axis A into the direction B perpendicular to the axis A. The direction of the axis B can be selected as desired, with respect to its rotation angle about the axis A, through corresponding rotation of the deflector unit 9 about the axis A. The axis B is the optical axis of the laser beam L after or downstream from the first deflector mirror 4, and also coincides with the rotation axis of the deflector units 10A and 10B. Particularly, the deflector units 10A and 10B are rotatable about the axis B relative to the deflector unit 9 by being rotationally driven by the drive unit 3 through the drive rings 7 and 8 respectively.

The deflector unit 10A includes or carries a second deflector mirror 5 having a basic adjustment or centered setting at an angle of 45° relative to the axis B. This mirror 5 further deflects the laser beam L from the axis B into the direction C in which the laser beam L is finally emitted from the transmitter unit T. The mirror 5 is connected to two electromechanical actuator elements 11 and 12, e.g. piezoactuators 11 and 12, which can respectively tilt the mirror 5 about two axes perpendicular to the axis B. This tipping motion caused by the actuator elements 11 and 12 has a smaller range of adjustment and a quicker adjustment time than the rotation about the axes A and B as described above. Thus, relatively slow gross movements of the laser beam L through large deflection angles (causing a gross or basic adjustment of the beam position) are achieved by rotation about the axes A and/or B as driven by the drive units 2 and/or 3, while relatively rapid but smaller fine movements of the laser beam L (causing a fine adjustment and/or fine oscillating modulation of the beam position relative to the basic adjustment) are achieved by corresponding rapid small movements of the second deflector mirror 5 actuated by the actuator elements 11 and 12. The possible rotation angles about the axes A and B respectively can be less than or equal to 360°, i.e. any portion of a circle or a complete circle, or even greater than 360°, e.g. continuous successive complete rotations.

The deflector unit 10B is rotated synchronously with the deflector unit 10A about the axis B, as driven by the drive unit 3 through the drive ring 8. While the deflector unit 10A forms part of the laser beam emitting arrangement, the deflector unit 10B forms part of a reflection detector arrangement for receiving a returned reflected beam L' that results as a reflection of the emitted laser beam L. The deflector unit 10B includes or has a reflection detector unit mounted or installed thereon. For example, the detector unit includes a parabolic mirror 28 and a radiation detector or sensor 29 arranged at a focal point of the parabolic mirror 28 to receive and detect the reflected light L' that is received as a reflection of the emitted laser beam L from the receiver unit R. The synchronous rotating of both deflector units 10A and 10B ensures that the detector unit including the parabolic mirror 28 and the radiation detector 29 is always oriented in the same direction C of the basic gross adjustment or position the laser beam L emitted from the transmitter unit T (excluding the fine modulation adjustments achieved by the piezoelectric actuator elements 11 and 12).

Although not illustrated in detail, the first deflector mirror 4 may similarly be deflectable over small angular ranges by actuator elements similar to the piezoactuator elements 11 and 12 provided for the mirror 5. Such small additional deflections of the mirror 4 are merely optional and not absolutely necessary, namely the mirror 4 can be fixed to the deflector unit 9.

The construction of the fine adjustment mechanism for the deflector mirror 5 (and/or optionally the deflector mirror 4) based on a piezoelectric crystal actuator arrangement is schematically illustrated in a detail view in FIG. 2. As shown, the respective mirror 5 (or 4) is mounted to be pivotable about a point P. In the present illustration, for simplicity, only a single piezoelectric crystal actuator element 11 is illustrated, but it should be understood that the arrangement further includes the second piezoactuator element 12 arranged to be effective about a second axis perpendicular to the axis B. Referring to FIG. 2, the piezoelectric crystal actuator element 11 is arranged between two lever arms 13 and 14, of which one lever arm 13 directly acts on and deflects the mirror 5, while the other lever arm 14 allows the entire piezoelectric actuator element 11 to be adjusted and pre-stressed by means of an adjusting mechanism or device 15. The entire arrangement and mounting of both piezoelectric crystal actuator elements 11 and 12 for a respective mirror is incorporated and housed in its respective own low-distortion housing 16. The housing 16 has been omitted from FIG. 1 for the sake of clarity.

Figure 3:
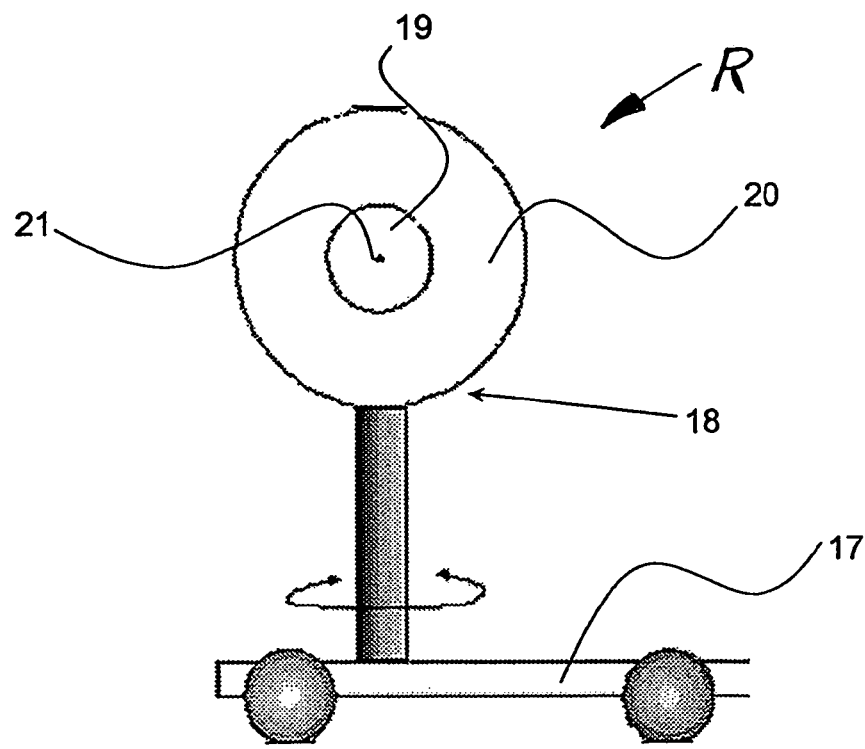
FIG. 3 is a schematic diagram showing a front view of a receiver unit according to the invention.
Figure 4:
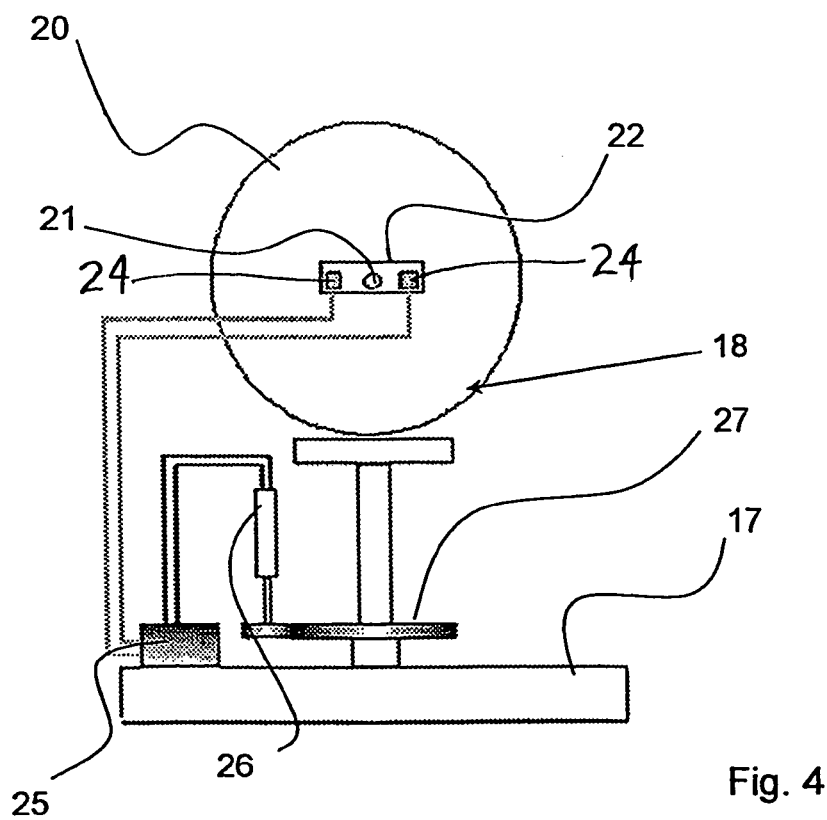
FIG. 4 is a schematic diagram showing a rear view of the receiver unit according to FIG. 3.
Figure 5:
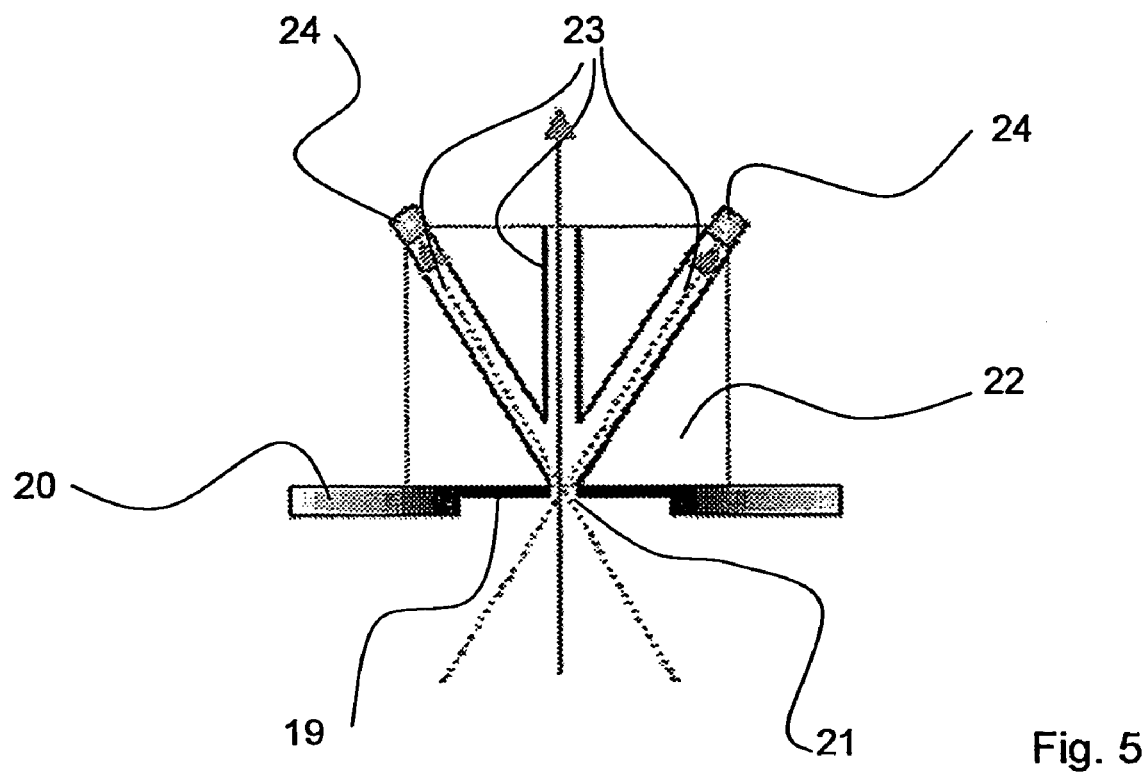
FIG. 5 is a schematic diagram, on an enlarged scale, of a direction-sensitive detector arrangement for receiving and directionally sensing the laser beam, in the receiver unit according to FIGS. 3 and 4.

FIGS. 3 to 5 show the mobile receiver unit R according to the invention, for example arranged on, incorporated in, being, or comprising a spacecraft or a reconnaissance vehicle 17 as represented schematically in the present example embodiment. Namely, the receiver unit R can be regarded as a separate receiver module mounted on a device such as a reconnaissance vehicle, or can be regarded as being the entire vehicle including the incorporated energy-receiving equipment. An important feature is that the inventive system can supply all of the operating energy required by the entire reconnaissance vehicle.

This receiver unit R can be located at essentially any desired distance from the transmitter unit T (limited essentially only by the maximum effective transmission distance of the laser beam L, e.g. in view of beam spreading or dispersion, as well as blockage of the beam by the interposed atmosphere or obstacles), whereby the receiver unit R must simply be positioned in the direct field of view or line of sight of the transmitter unit T. The receiver unit R comprises a rotatable and regulatable radiation receiver arrangement 18, e.g. in the form of a receiver sight attachment that can be mounted on the reconnaissance vehicle 17 and serves to receive the laser beam L and to extract from the laser beam L the energy required to operate the reconnaissance vehicle 17.

In this regard, the radiation receiver arrangement 18 comprises a photovoltaic cell arrangement 19 and a reflector arrangement 20 in the shape of a ring, i.e. a reflector ring 20 encircling or surrounding the photovoltaic cell arrangement 19. The incident laser beam L or any portion thereof falling on the photovoltaic cell arrangement 19 is converted by the photovoltaic cells into an electrical current that is provided to supply the necessary operating energy of the receiver unit R (e.g. including the reconnaissance vehicle 17) as described above. On the other hand, the laser beam L or any portion thereof falling on the reflector ring 20 is reflected to form reflected light L' that returns back to the transmitter unit T to be received by the reflection detector arrangement (e.g. 28 and 29) thereof as described above. The reflector ring 20 uses any conventionally known reflector techniques and structures for achieving a high reflectance ratio in a specular, diffuse, mono-directional or non-directional manner, or any other type of reflection.

Due to the selected beam profile of the laser beam L, a portion of the laser beam may always fall onto the reflector ring 20 surrounding the photovoltaic cell arrangement 19, so that the corresponding portion of the laser beam L falling on the reflector ring 20 can always be reflected as the reflected light L' back to the transmitter unit T. The size or diameter of the laser beam L is preferably selected so that it is smaller than the diameter of the photovoltaic cell arrangement 19, in order to ensure that the majority of the total available light energy of the laser beam L is available and used for conversion into electrical energy by the photovoltaic cell arrangement 19, and only a very small portion of the total laser beam energy is reflected back as the reflected light L'. Of course, the pertinent diameter of the laser beam L depends on the beam divergence or spread angle as well as the momentary transmission distance between the transmitter unit T and the receiver unit R.

As further evident in FIGS. 3 and 4, and especially shown in detail in FIG. 5, the radiation receiver arrangement 18 of the receiver unit R further comprises a beam orienting unit especially comprising a direction-sensitive sensor 22, which is adapted to detect the incident orientation or angle of the received laser beam L, to ensure that the radiation receiver arrangement 18 is oriented with its two perpendicular axes in the plane of the photovoltaic cell arrangement 19 always normal to the beam axis C of the incident laser beam L. Namely, the radiation receiver arrangement 18 will be rotated and tilted as necessary based on the information provided by the direction-sensitive sensor arrangement 22, so that the surface plane of the photovoltaic cell arrangement 19 is always oriented normal to the incident laser beam L, thereby optimizing the energy extraction from the laser beam.

As mentioned above, the key component of the orienting arrangement is the direction-sensitive sensor arrangement 22, which is arranged behind a small hole 21 in the center of the photovoltaic cell arrangement 19. As shown in FIG. 5, three radiation beam tubes 23 are arranged at different angles, e.g. one tube directly along the beam axis and two tubes diverging to the left and to the right thereof respectively, extending rearwardly from the hole 21. The sensor arrangement 22 further comprises respective photodiodes 24 arranged at the distant ends of the radiation beam tubes 23. Thus, the photodiodes 24 detect the intensity of (the entirety or respective portions of) the received incident laser beam respectively in the directions of the radiation beam tubes 23. By comparing the respective intensities detected by the photodiodes 24, it is possible to determine whether the radiation receiver 18 is oriented properly with the two axes in the plane of the photovoltaic cell arrangement 19 both oriented perpendicularly to the incident beam axis, or whether there is any deviation that is to be corrected.

An evaluation of the received light intensity detected by the photodiodes 24 is carried out in an evaluating unit 25 connected to receive the output signals of the photodiodes 24. If any deviation is detected, suitable control electronics integrated in the evaluating unit 25 actuate motors 26 and drive elements 27 in order to rotate and pivot the radiation receiver arrangement 18 into proper axial alignment with the incident laser beam L. The simplified schematic view of FIG. 4 does not show the motor or actuator required for tilting or pivoting the radiation receiver arrangement 18 about another axis, but for simplicity merely shows the mechanism for rotating the radiation receiver arrangement 18 about a vertical axis as indicated by the double-headed rotation arrow in FIG. 3.

As the receiver unit R, i.e. especially the reconnaissance vehicle 17, moves relative to the transmitter unit T, this orienting system ensures that the radiation receiver arrangement 18 is always properly oriented to best receive the incident laser beam L, regardless of the orientation of the reconnaissance vehicle 17 itself.

Now returning to FIG. 1, the portion of the laser beam L that has been reflected as reflected light L' from the receiver unit R back to the transmitter unit T is received, gathered and focused by the parabolic mirror 28 of the transmitter unit T and is then detected by the central radiation detector or sensor 29 as mentioned above. The received radiation signal is subjected to specific filtering and is converted into an information signal that will provide information regarding the position of the laser beam L relative to the photovoltaic cell arrangement 19 and the reflector 20 of the radiation receiver arrangement 18 of the receiver unit R, as will be discussed in detail below. The resulting information signal is used in a computer control unit 30 to generate control signals to control the deflector units 9, 10A and 10B so as to optimally adjust the orientation of the mirrors 4 and 5 so as to direct the laser beam L in a tracking or following manner directly toward the photovoltaic cell arrangement 19 of the radiation receiver arrangement 18 of the receiver unit R.

More particularly in this regard, the computer control unit 30, on the basis of the received reflection signal information, carries out a cascaded regulation by which the motors of the drive units 2 and 3 are controlled to drive or actuate the gross adjustment of the mirrors 4 and 5, and also to control the piezoelectric crystal actuator elements 11 and 12 to drive or actuate the fine adjustment of the movements of the deflector mirror 5 (and optionally 4) about the respective pivot point P. In this manner, the entire laser beam emitting system is regulated in a tracking or following manner, with both large-scale or gross adjustments as well as fine adjustments, to always keep the laser beam L oriented directly at the photovoltaic cell arrangement 19 of the receiver unit R.

In addition to the transmitter unit T and the receiver unit R described above, the overall inventive system or apparatus further comprises a control program that incorporates and carries out the entire procedural sequence for the automatic transmission of energy from the transmitter unit T to the mobile receiver unit R. This control program essentially comprises two parts or components, namely a search algorithm or mode for initially searching for and finding the receiver unit R by scanning the laser beam L over a large area or field, and a following or tracking algorithm or mode by which the receiver unit, once initially found, is exactly followed or tracked even over long time durations, so that thereby energy may be constantly supplied to the receiver unit R.

In the search mode of the control program being executed by the computer control unit 30, the control unit 30 first controls the laser unit 1 to generate a weaker or lower power laser beam, and then controls the two motor drive units 2 and 3 of the transmitter unit T to scan the weak laser beam over a relatively large target area or field, while waiting to detect any return reflection of the laser radiation with reflection detector arrangement, e.g. the parabolic mirror 28 and the radiation detector 29.

If such a reflection is detected, then the search mode switches into a sub-mode in which the close proximity of the last detected reflection position is scanned with greater accuracy or precision, and thereby the center or average circle of the reflector ring 20, i.e. the circle having the diameter $R_m$ corresponding to the average of the outer diameter $R_a$ and the inner diameter $R_i$ of the annulus of the reflector 20, is automatically determined. In this regard, the laser beam L is moved with greater precision by appropriately controlling the fine adjustment by means of the piezocrystal actuator elements 11 and 12. This is carried out in a two-stage process as follows.

Figure 6:
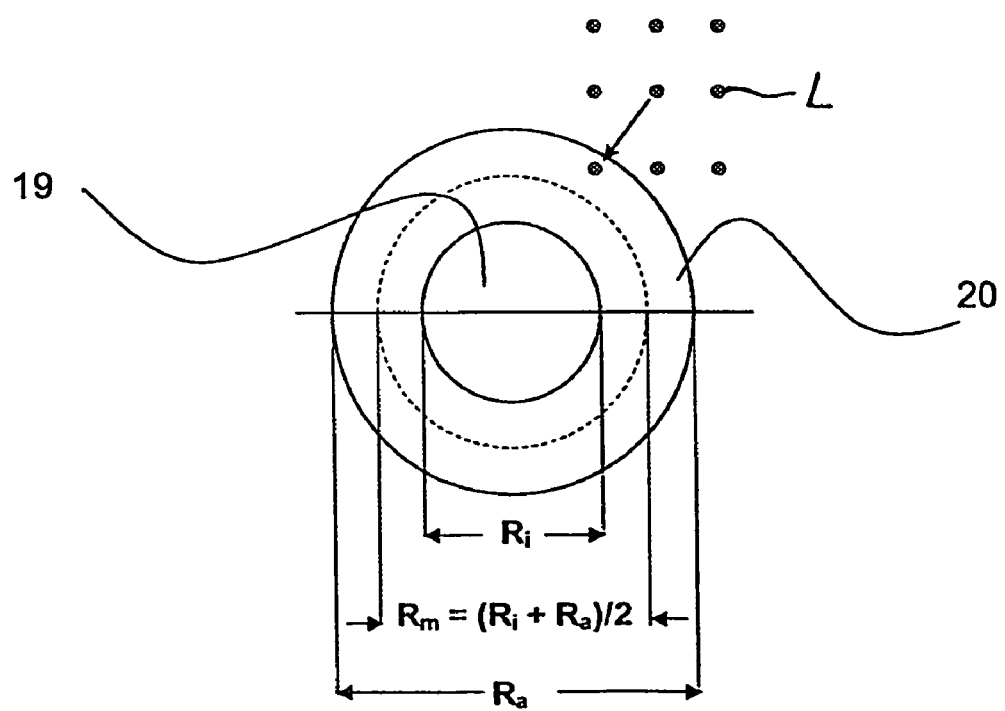
FIG. 6 is a schematic diagram illustrating a first method of scanning or moving the laser beam emitted by the transmitter unit to search for and find the ring-shaped reflector of the laser radiation receiver arrangement of the receiver unit.

In a first stage or step, the deflector units 9 and 10 and particularly the piezocrystal actuator elements 11 and 12 are controlled to scan the laser beam L in a search grid or raster of scanning points in a three-by-three matrix as schematically represented in FIG. 6. From this three-by-three matrix of laser beam scan points, the point resulting in or producing the greatest intensity of the reflected light is determined and used as the new centerpoint or starting point of another three-by-three scanning point matrix of the laser beam L. This process is repeated several times so that the successive three-by-three matrices of scanning points move successively toward a location of greater reflection intensity, i.e. whereby the laser beam becomes directed more accurately or more entirely onto the reflector ring 20 of the receiver unit R.

Figure 7:
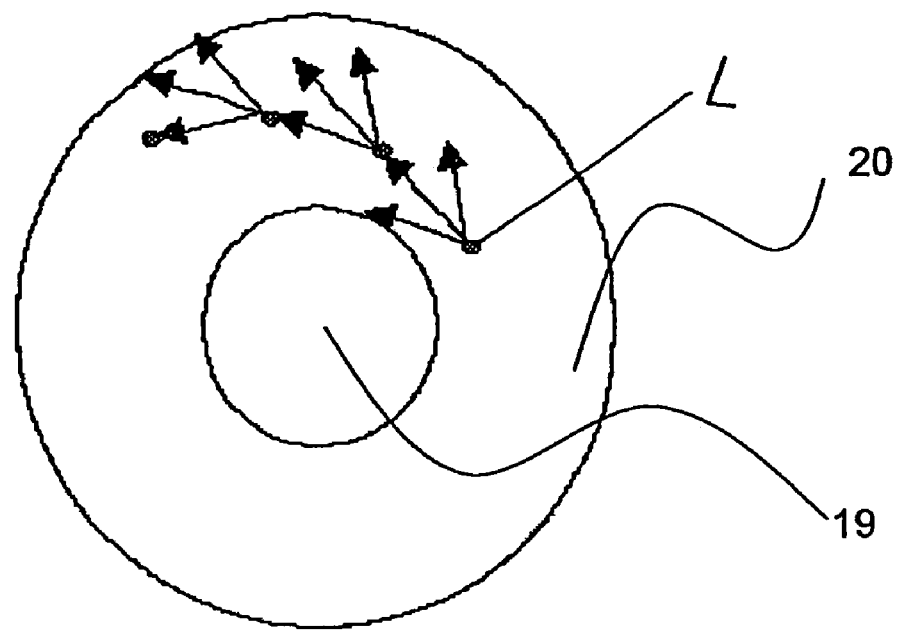
FIG. 7 is a schematic diagram illustrating a method for detecting and locating the reflector ring of the laser radiation receiver arrangement of the receiver unit.

Then, in a subsequent second stage or step of this process, the form or shape of the reflector ring 20 and therewith the center position of the photovoltaic cell arrangement 19 is detected. This second step is carried out according to an algorithm illustrated in FIG. 7. Beginning from a starting point, plural search steps, e.g. three search steps in the illustrated example, are carried out by scanning or moving the laser beam by a specified distance in plural (e.g. three) specified directions from the starting point. For each one of these search steps, the resulting reflection signal strength is measured and compared. The particular step direction and step end point associated with the strongest reflection signal intensity value is then taken as a new main analysis direction, i.e. to establish a new starting point for repeating this scanning process. This process is repeated so often until the contour of the ring reflector 20 has been completely detected by the succession of search steps from each successive starting point, resulting in a pattern of resulting reflection signal intensities.

Then, based on the individual reflection signal intensity values of the several successive positions, a center of intensity (like a center of gravity, but referring to the intensity values) calculation of the surface area spanned by the search steps can determine the center of this area. Based on this information, the emitted laser beam L can be directly and exactly oriented onto the photovoltaic cell arrangement 19 at the center of the reflector ring 20.

This method does not necessarily require the receiver unit or particularly the radiation receiver arrangement thereof to be oriented normal to the direction or axis of the laser beam L for initially seeking and detecting or locating the photovoltaic cell arrangement 19. To the contrary, the photovoltaic cell arrangement 19 can be securely and reliably detected, located and measured or sensed even when it is oriented at a tilt angle relative to the laser beam. Nonetheless, to then maximize the energy extraction from the laser beam, the radiation receiver arrangement 18 is preferably readjusted to be normal to the incident beam, as described above.

Once the radiation receiver arrangement 18 and particularly the photovoltaic cell arrangement 19 of the receiver unit R has been initially found, detected and located, the further following or tracking thereof by the emitted laser beam L can be securely and reliably carried out alternatively by any one of four different basic algorithms, which will be described in the following.

In the first method, which can be referred to as a "random walk" method, the position of the emitted laser beam L beginning from a starting position is changed or moved by a small step in any desired, e.g. arbitrary or random direction. After the emitted laser beam has been moved by this step to the new random position, the parabolic mirror 28 and radiation detector 29 of the transmitter unit T detect the reflected light L' that is reflected back from the receiver unit R, and it is determined whether the random step yielded an "improvement" (e.g. decrease) or a "worsening" (e.g. increase) of the reflected light intensity. If the reflected light intensity became worse (e.g. increased) due to the random step, then the emitted laser beam L is moved or jumped back to the prior starting position, i.e. to "undo" the random step. On the other hand, if the reflected light intensity was improved (e.g. decreased) by the random step, then the position of the laser beam after this random step is taken as the new starting position. Then the random step procedure is repeated with a new step again in any desired random direction from the new starting point.

In general and in the above context, the evaluation of the reflected light can determine whether there has been an improvement or a worsening of the desired reflected light situation. Particularly, this can be determined based on the total intensity of the reflected light that is reflected back from the receiver unit. Namely, the closer the incident laser beam L is positioned to the center of the photovoltaic cell arrangement 19, the less light of the laser beam will impinge on the reflector ring 20, so that a lower reflected intensity will result. In other words, once the laser beam is known to be falling on the radiation receiver arrangement 18 including the photovoltaic cell arrangement 19 and the reflector ring 20, a better positioning of the laser beam onto the center of the photovoltaic cell arrangement 19 will be indicated by a lower reflection intensity. Thus, an "improvement" in the above context means a reduction of the reflection intensity, while a "worsening" means an increase of the reflection intensity.

Alternatively, for example, the improvement or worsening of the reflected light can be determined by the "modulation method", i.e. by the detection of the double frequency of the laser beam position modulation, as will be described below as a separate stand-alone method.

Figure 8:
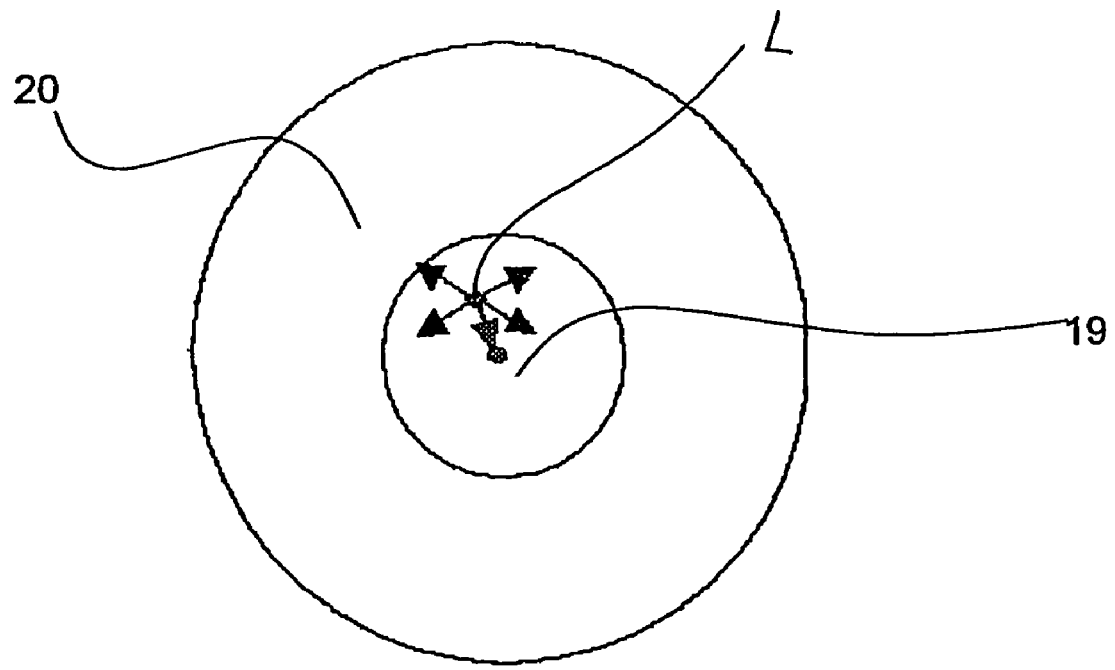
FIG. 8 is a schematic diagram illustrating a method of re-orienting the laser beam in a tracking or following manner on the laser beam radiation receiver arrangement of the receiver unit.

In the second method, which can be referred to as a "center of concentration" or "center of reflection intensity" or generally "center value" method, the momentary position of the laser beam is determined or specified as a center or middle point. Then, at least three vectors respectively having the same length but respective different directions are selected, relative to the centerpoint. The at least three distinct directions are preferably selected so that they are axis-symmetrical relative to the horizontal and vertical axes as illustrated in FIG. 8 in connection with four vectors. Then the laser beam L is successively moved and positioned to the respective vector end points in the respective vector directions, and the resulting reflection signal strength at each end point is determined, i.e. measured.

After each position has been measured once, a center of intensity or center value calculation carries out a weighting of the vectors with their respective reflection signal strengths relative to one another. The result is a new vector, which points in the direction of strongest reflection intensity, and which has a magnitude representing a measure of the distance of the shifting or displacement of the laser beam. A new centerpoint is determined on the basis of this resulting new vector, i.e. as the end point of the resulting new vector.

This method can still further be optimized in that a correction step of the new and old vectors is determined already after each individual measurement. Through such an optimization, on the one hand the reaction capacity of the system is increased, and on the other hand the directional changes are made smoother because a slight correction is carried out already after each measurement and not only after a full or complete cycle.

Figure 9A:
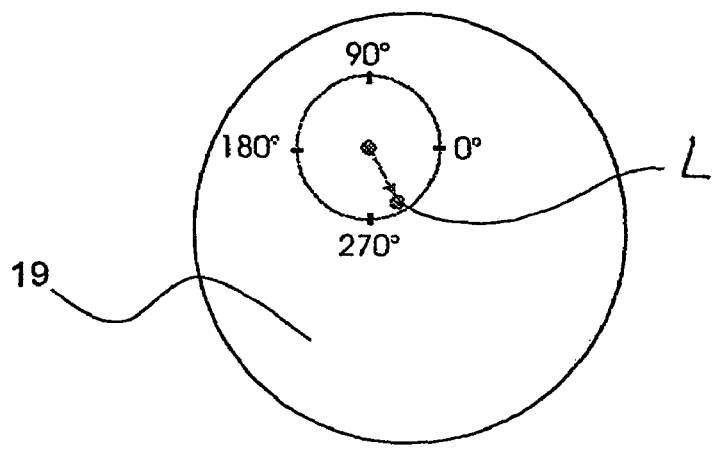
FIG. 9A is a schematic diagram illustrating another method of re-orienting the laser beam in a tracking or following manner on the laser beam radiation receiver arrangement of the receiver unit.

In the third method, which can be called a "circle method", the second deflector mirror 5 is caused to undergo circular motions, e.g. around the basic adjustment axis, for example by appropriately controlling the piezoelectric crystal actuators 11 and 12. Particularly, an oscillating modulation at the frequency f in the horizontal direction is imposed on the mirror 5, and simultaneously an oscillating modulation at the same frequency f but phase-shifted by 90° is imposed in the vertical direction on the mirror 5. This causes the mirror 5 to undergo a circular motion as mentioned above. Thereby, the laser beam L deflected from the mirror 5 similarly undergoes a circular modulation about a respective centerpoint defined by the basic adjustment axis, as illustrated schematically in FIG. 9A.

Figure 9B:
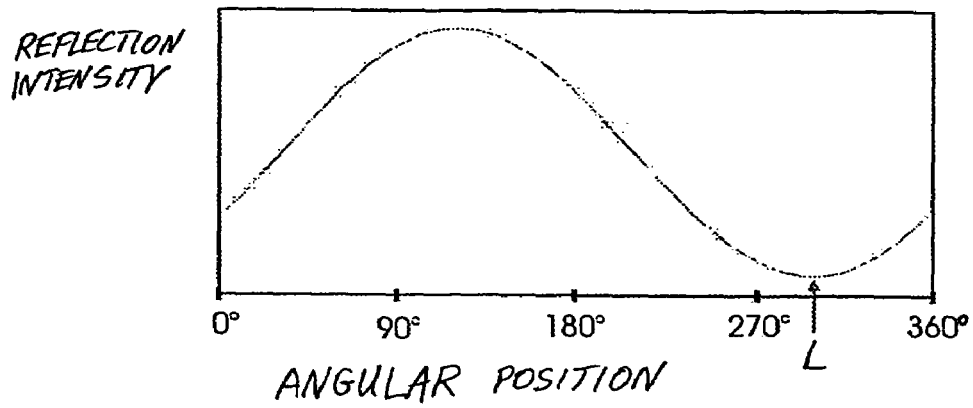
FIG. 9B is a diagram illustrating the radiation magnitude or intensity of the received reflected beam as a function of the momentary angular position of the emitted laser beam about a basic beam adjustment.

By measuring the reference voltage on the piezocrystal actuator elements 11 and 12, it is possible to determine the momentary angular position of the mirror 5 at any time, and therewith the momentary angular position of the laser beam L about the respective scanning centerpoint. Then, while the laser beam goes through exactly one complete circular scan of 360° (see FIG. 9A) the reflection signal intensity is continuously measured. Thereby, the reflection signal intensity will exhibit a sinusoidal variation, i.e. forming a sinusoidal curve as shown in FIG. 9B, as a function of the momentary angular position of the laser beam. In this regard, the greater the amplitude of the reflection signal, the farther the laser beam has strayed from the center of the photovoltaic cell arrangement 19 and instead impinged more on the reflector ring 20. Through a comparison with the reference signal of the piezocrystal actuator elements, it is thus possible to allocate spatial directions of the angular position of the laser beam to the associated phase angle of the received reflection signal. Then, the beam motion is regulated in or toward the direction of weakest reflection signal intensity, in order to move or keep the laser beam L centered on the photovoltaic cell arrangement 19.

Figure 10:
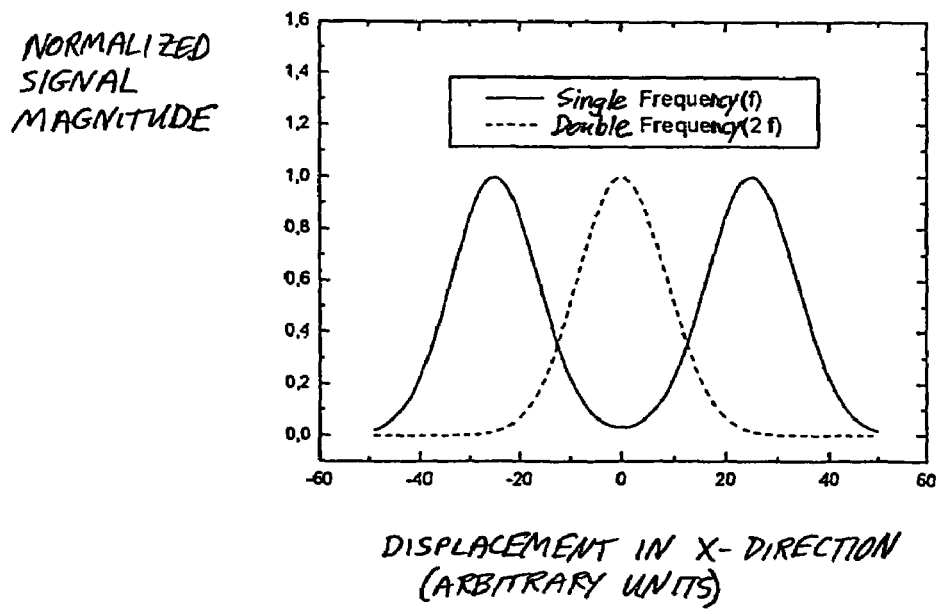
FIG. 10 is a schematic diagram of normalized signal magnitude versus the displacement in the X-direction in arbitrary units, exhibiting the occurrence of the fundamental and the first harmonic of the modulation frequency of the laser beam dependent on the spatial detuning or misalignment of the laser beam on the laser beam radiation receiver arrangement of the receiver unit.

In the fourth method, which can be called a "modulation method" the position x of the laser beam about its center position $x_M$ is modulated dependent on the time t with a modulation frequency f according to $x=x_M+x_0 \sin(2\pi ft)$. As shown in FIG. 10, since a portion of the laser beam L always falls on the reflector ring 20, the reflected light L' that is reflected back toward the transmitter unit T will be modulated at the frequency f and its higher harmonics, due to the modulated motion of the laser beam L at the frequency f cyclically falling more-on and more-off the reflector ring 20. For example, since a single cyclical motion or modulation of the laser beam L will show an increase and decrease of a reflection first on one side of the reflector ring 20 and then on the other side of the reflector ring 20 (relative to the centerpoint 21 of the photovoltaic cell arrangement 19), the reflection signal will, for example, exhibit an intensity modulation with twice the frequency f.

FIG. 10 shows the back-reflected light intensity of the reflected light L' dependent on the position of the laser beam L on the radiation receiver arrangement 18. If $x_M$ is exactly the position in the middle of the photovoltaic cell arrangement 19, and $x_0$ is less or smaller than the radius of the photovoltaic cell arrangement 19, then portions of the laser beam L will fall both on the right and on the left of the reflector ring 20 in one oscillation cycle. Thus, the reflected light L' is modulated with twice the frequency f, i.e. with the doubled frequency $2f$, as generally mentioned above and specifically shown as an example in FIG. 10.

The further the position $x_M$ is located away from the center of the photovoltaic cell arrangement 19, the smaller the reflection component at $2f$ becomes, because the reflector ring 20 will become less-and-less impinged on by the laser beam on one side thereof relative to the centerpoint. If the position $x_M$ lies exactly on the edge or rim of the photovoltaic cell arrangement 19, then the laser beam L will be directed onto the photovoltaic cell arrangement 19 for half of the time and onto the reflector ring 20 for the other half of the time of one oscillation cycle of the laser beam. Thus, in such a case, the reflected light L' is modulated only with the frequency f and has essentially no component remaining at the frequency $2f$. If the laser beam should fall onto the middle or average radius of the reflector ring 20 (i.e. the position $x_M$ on the center circle $R_M$ in FIG. 6), then a strong component at the frequency $2f$ will again arise in the reflected light L'. This component is, however, phase-shifted by 180° relative to the position $x_M$ in the center of the photovoltaic cell arrangement 19, because the laser beam L falls on only slightly reflective structures at the reversal points of the oscillation.

Thus, as seen from the above description, the quality or degree of correspondence of the position $x_M$ of the laser beam L with the centerpoint of the photovoltaic cell arrangement 19 can be determined or derived from the magnitude and the phase of the components of the reflected light L' at the frequency $2f$. As examples, a lock-in amplifier or a Fourier analysis unit can be used as the regulating or control circuit for this tracking method.

The above described modulation method is not limited to a single dimension, i.e. a linear oscillation of the laser beam L back-and-forth in a single direction. To the contrary, the mirror 5 can be moved or modulated simultaneously in the horizontal direction and the vertical direction respectively with two different frequencies $f_H$ and $f_V$. Preferably, these two frequencies are clearly different and distinguishable from one another and not related by any rational ratio relative to one another, in order to ensure that a frequency analysis of the returned reflected light L' allows an exact accurate recognition of the manner in which the position of the laser beam L deviates from the center of the photovoltaic cell arrangement 19.

In any one of the above manners, an optimal orientation or direction of the emitted laser beam onto the radiation receiving arrangement of the receiver unit is achieved. Simultaneously, this ensures a maximum transmission and coupling of energy from the transmitter unit T to the receiver unit R. It should be understood that the above described tracking methods serve to move the laser beam emitted from the transmitter unit as necessary to keep the laser beam directed onto the center of the photovoltaic cell arrangement of the receiver unit, and to thereby follow or track the relative motion of the receiver unit compared to the transmitter unit.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An apparatus for transmitting energy over a distance without a direct electrical or mechanical connection for the transmitting of the energy, comprising:

a transmitter unit including a laser generator adapted to emit a laser beam, a deflector arrangement including at least one movable deflector mirror that is interposed in a beam path of said laser beam and adapted to deflect said laser beam, a drive arrangement coupled to said deflector arrangement and adapted to move said at least one movable deflector mirror so as to vary a direction of an emitted beam axis of said laser beam leaving said transmitter unit, and a controller that is connected for control signal transmission to said drive arrangement and is adapted to generate control signals to control said drive arrangement; and a receiver unit arranged at said distance away from said transmitter unit, and including a radiation receiver arrangement that is adapted to receive said laser beam incident thereon, and that comprises a photovoltaic cell arrangement and a ring-shaped reflector around said photovoltaic cell arrangement, wherein said reflector is adapted to reflect as reflected light at least some of said laser beam incident thereon;

wherein said transmitter unit further comprises a reflection detector arrangement including a light sensor that is adapted to detect said reflected light and is connected for signal transmission to said controller; and wherein said reflection detector arrangement is connected to said deflector arrangement and coupled to said drive arrangement so that said reflection detector arrangement undergoes at least gross movements together with said deflector arrangement and remains oriented with a sensitive axis of said reflection detector arrangement parallel to a basic direction of said emitted beam axis of said laser beam leaving said transmitter unit.

2. The apparatus according to claim 1, wherein said receiver unit is movable relative to said transmitter unit, and said controller is adapted to control said drive arrangement to move said at least one movable deflector mirror so as to move said emitted beam axis of said laser beam leaving said transmitter unit to track said receiver unit during a relative movement between said receiver unit and said transmitter unit.

3. The apparatus according to claim 1, wherein said at least one movable deflector mirror is respectively mounted in said transmitter unit so as to be rotatable about a respective local axis of said laser beam impinging on said movable deflector mirror.

4. An apparatus for transmitting energy over a distance without a direct electrical or mechanical connection for the transmitting of the energy, comprising:

a transmitter unit including a laser generator adapted to emit a laser beam, a deflector arrangement including at least one movable deflector mirror that is interposed in a beam path of said laser beam and adapted to deflect said laser beam, a drive arrangement coupled to said deflector arrangement and adapted to move said at least one movable deflector mirror so as to vary a direction of an emitted beam axis of said laser beam leaving said transmitter unit, and a controller that is connected for control signal transmission to said drive arrangement and is adapted to generate control signals to control said drive arrangement; and a receiver unit arranged at said distance away from said transmitter unit, and including a radiation receiver arrangement that is adapted to receive said laser beam incident thereon, and that comprises a photovoltaic cell arrangement and a ring-shaped reflector around said photovoltaic cell arrangement, wherein said reflector is adapted to reflect as reflected light at least some of said laser beam incident thereon;

wherein said drive arrangement comprises a motor drive unit coupled to said deflector arrangement and adapted to carry out relatively slower and relatively larger gross rotational movements of at least a given mirror among said at least one movable deflector mirror, and at least one piezoelectric actuator element coupled to said given mirror and adapted to carry out relatively faster and relatively smaller fine oscillating movements of said given mirror.

5. An apparatus for transmitting energy over a distance without a direct electrical or mechanical connection for the transmitting of the energy, comprising:

a transmitter unit including a laser generator adapted to emit a laser beam, a deflector arrangement including at least one movable deflector mirror that is interposed in a beam path of said laser beam and adapted to deflect said laser beam, a drive arrangement coupled to said deflector arrangement and adapted to move said at least one movable deflector mirror so as to vary a direction of an emitted beam axis of said laser beam leaving said transmitter unit, and a controller that is connected for control signal transmission to said drive arrangement and is adapted to generate control signals to control said drive arrangement; and a receiver unit arranged at said distance away from said transmitter unit, and including a radiation receiver arrangement that is adapted to receive said laser beam incident thereon, and that comprises a photovoltaic cell arrangement and a ring-shaped reflector around said photovoltaic cell arrangement, wherein said reflector is adapted to reflect as reflected light at least some of said laser beam incident thereon;

wherein said radiation receiver arrangement is movably mounted, and said receiver unit further comprises a direction-sensitive light sensor arrangement adapted to detect an incident direction of said laser beam, a receiver drive arrangement coupled to and adapted to move said radiation receiver arrangement, and a receiver controller connected to said direction-sensitive light sensor arrangement to receive signals therefrom and connected to said receiver drive arrangement to transmit control signals thereto, so as to move and orient said radiation receiver arrangement with respect to said incident direction of said laser beam.

6. A method of transmitting energy over a distance between a transmitter unit and a receiver unit, wherein said transmitter unit includes a deflector arrangement, a drive arrangement coupled thereto, and a reflection detector arrangement including a light sensor, wherein said method comprises the steps:

a) generating a laser beam in said transmitter unit;
b) using said deflector arrangement and said drive arrangement, directing and emitting said laser beam along an emitted beam axis oriented grossly in a basic direction from said transmitter unit toward said receiver unit;
c) receiving at least a first portion of said laser beam and extracting energy therefrom in said receiver unit;
d) reflecting at least a second portion of said laser beam as reflected light from said receiver unit;
e) receiving at least some of said reflected light with said reflection detector arrangement of said transmitter unit and evaluating said reflected light that is received to determine orienting information from said reflected light; and
f) carrying out said directing of said laser beam with said deflector arrangement and said drive arrangement in said step b) by actuating said drive arrangement in response to and dependent on said orienting information, wherein said reflection detector arrangement is connected to said deflector arrangement and coupled to said drive arrangement so that said reflection detector arrangement undergoes at least gross movements together with said deflector arrangement and remains oriented with a sensitive axis of said reflection detector arrangement parallel to said basic direction of said emitted beam axis of said laser beam.

7. The method according to claim 6, wherein said directing of said laser beam in said step b) includes modulating a direction of said laser beam, which leads to a resultant modulation of said reflected light in said step d), and said evaluating of said reflected light in said step e) determines a relative position of said laser beam relative to said receiver unit based on and dependent on said resultant modulation detected in said reflected light.

8. The method according to claim 7, further comprising moving said receiver unit relative to said transmitter unit, wherein said relative position of said laser beam relative to said receiver unit changes due to said moving of said receiver unit and due to changing of said directing of said laser beam, and wherein said evaluating of said reflected light further detects said moving of said receiver unit.

9. The method according to claim 6, wherein said receiver unit includes a photovoltaic cell arrangement and a reflector arranged around said photovoltaic cell arrangement, and wherein said directing of said laser beam in said step b) comprises redirecting said laser beam according to a prescribed beam redirection process so that said first and second portions of said laser beam impinge on and move along said photovoltaic cell arrangement and said reflector respectively.

10. The method according to claim 9, wherein said prescribed beam redirection process comprises a random walk process.

11. The method according to claim 10, wherein said random walk process is a weighted random walk process.

12. The method according to claim 9, wherein said prescribed beam redirection process comprises modulating a direction of said laser beam in an oscillating manner at a first frequency, which causes a resultant modulation of said reflected light including a modulated component at a second frequency that is double said first frequency, and said evaluating of said reflected light in said step e) includes evaluating said modulated component at said second frequency.

13. The method according to claim 9, wherein said prescribed beam redirection process comprises modulating a direction of said laser beam by providing an oscillating first modulation at a first frequency on a first axis and simultaneously providing an oscillating second modulation at a second frequency different from said first frequency on a second axis perpendicular to said first axis, which causes a resultant modulation of said reflected light including two modulated components at two different frequencies, and wherein said evaluating of said reflected light includes evaluating said two modulated components at said two different frequencies.

14. The method according to claim 9, wherein said prescribed beam redirection process comprises a center-of-intensity process.

15. The method according to claim 9, wherein said prescribed beam redirection process comprises a circle method.

16. The method according to claim 6, wherein said generating in said step a) generates said laser beam with a wavelength in a range from 200 nm to 10 µm.

17. A method of transmitting energy over a distance between a transmitter unit and a receiver unit, wherein said transmitter unit includes a deflector arrangement including at least one movable deflector mirror, and a drive arrangement including a motor drive unit and a piezoelectric actuator element that are both respectively coupled to said deflector mirror, and wherein said method comprises the steps:

a) generating a laser beam in said transmitter unit;
b) using said deflector mirror and said drive arrangement, directing and emitting said laser beam from said transmitter unit toward said receiver unit;
c) receiving at least a first portion of said laser beam and extracting energy therefrom in said receiver unit;
d) reflecting at least a second portion of said laser beam as reflected light from said receiver unit;
e) receiving and evaluating at least some of said reflected light in said transmitter unit to determine orienting information from said reflected light; and
f) carrying out said directing of said laser beam in said step b) in response to and dependent on said orienting information, wherein said directing of said laser beam comprises moving said deflector mirror with said drive arrangement to move said laser beam with a combination of relatively slower and relatively larger gross rotational movements of said deflector mirror by said motor drive unit and relatively faster and relatively smaller fine oscillating movements of said deflector mirror by said piezoelectric actuator element.

18. A method of transmitting energy over a distance between a transmitter unit and a receiver unit, wherein said receiver unit includes a photovoltaic cell arrangement, a reflector, a direction-sensitive light sensor arrangement, a controller, and a receiver drive arrangement, and wherein said method comprises the steps:
  a) generating a laser beam in said transmitter unit;
  b) directing and emitting said laser beam from said transmitter unit toward said receiver unit;
  c) receiving at least a first portion of said laser beam and extracting energy therefrom using said photovoltaic cell arrangement in said receiver unit;
  d) reflecting at least a second portion of said laser beam as reflected light from said reflector of said receiver unit;
  e) receiving and evaluating at least some of said reflected light in said transmitter unit to determine orienting information from said reflected light;
  f) carrying out said directing of said laser beam in said step b) in response to and dependent on said orienting information;
  g) detecting an incident direction of said laser beam onto said photovoltaic cell using said direction-sensitive light sensor arrangement; and
  h) using said receiver drive arrangement under control by said controller, moving said photovoltaic cell arrangement and said reflector so as to orient said photovoltaic cell arrangement and said reflector in response to and with respect to said incident direction of said laser beam.

* * * * *